No. 861,948. PATENTED JULY 30, 1907.
E. C. BURGESON.
SLED RUNNER.
APPLICATION FILED MAY 14, 1906.

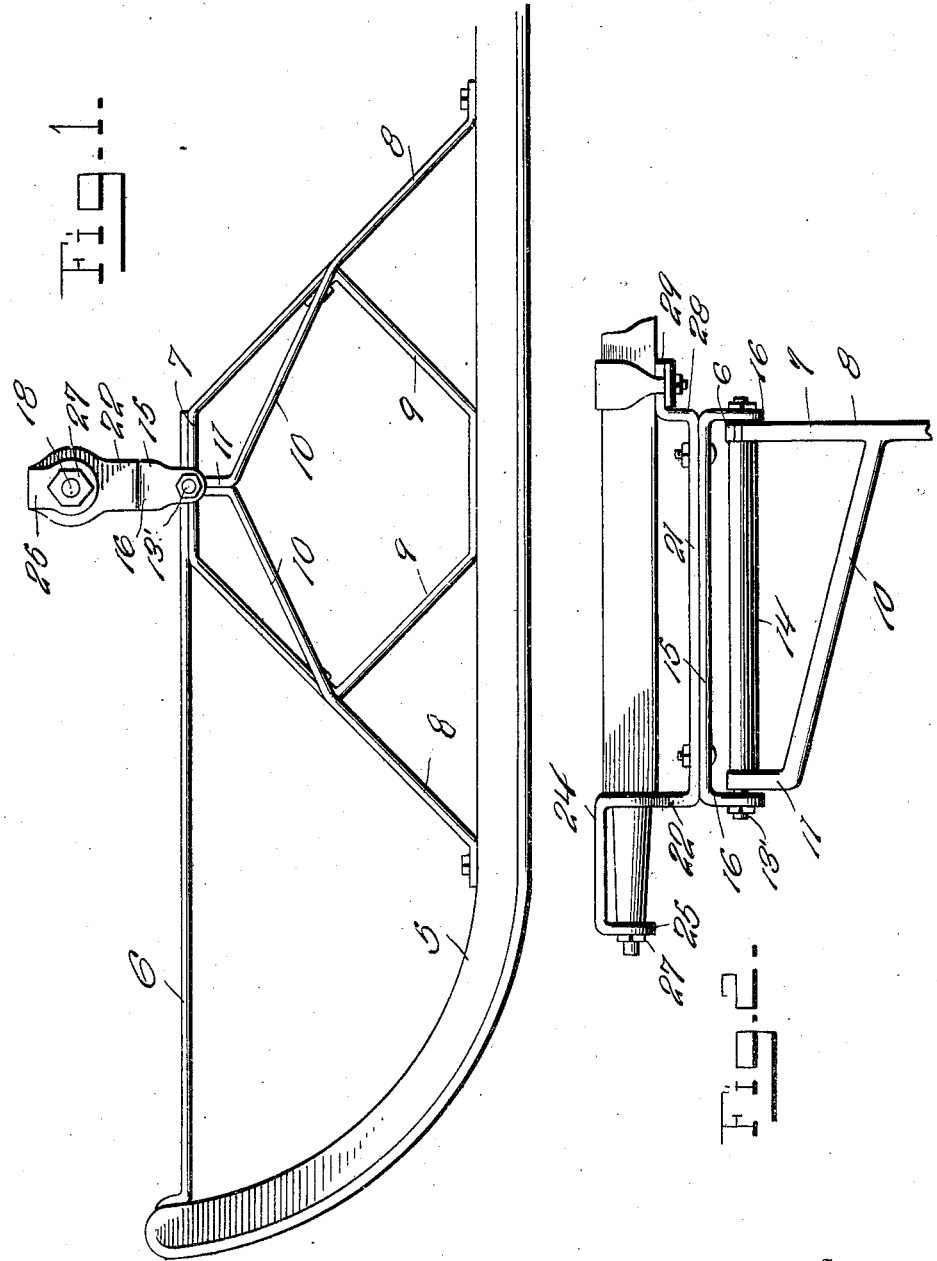

2 SHEETS—SHEET 2.

Witnesses
G. R. Thomas
F. B. MacNab

Inventor
E. C. Burgeson
By Chandler & Chandler
Attorneys

UNITED STATES PATENT OFFICE.

EMRICK C. BURGESON, OF SWEDEN, WISCONSIN.

SLED-RUNNER.

No. 861,948.

Specification of Letters Patent.

Patented July 30, 1907.

Application filed May 14, 1906. Serial No. 316,830.

*To all whom it may concern:*

Be it known that I, EMRICK C. BURGESON, a citizen of the United States, residing at Sweden, in the county of Bayfield, State of Wisconsin, have invented certain new and useful Improvements in Sled-Runners; and I do hereby declare the following to be a full, clear, and exact description of the invention, such as will enable others skilled in the art to which it appertains to make and use the same.
This invention relates to sled runners and more particularly to means for attaching the runners to the axles of a vehicle to enable the same to be used as a sled, it being understood that the wheels of the vehicle are removed before such connection of the runners therewith.

To this end the invention resides in the provision of a novel form of bracket for attaching the runners to the axle of a vehicle, the said bracket constructed in such a manner that a firm connection will be made although the runner may be quickly attached and detached from the vehicle.

Figure 3:
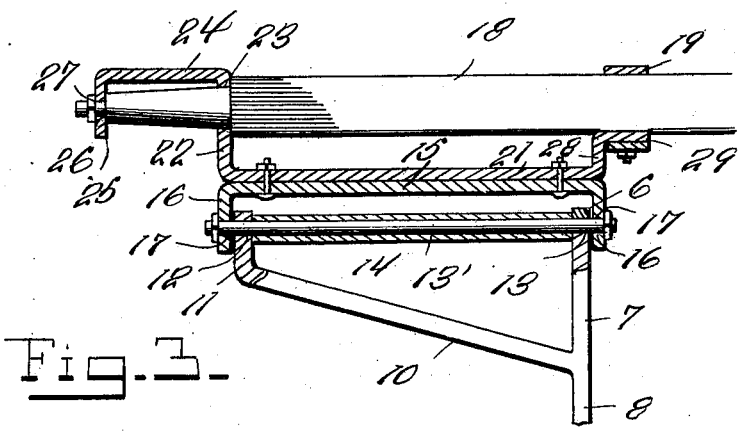
Figure 4:
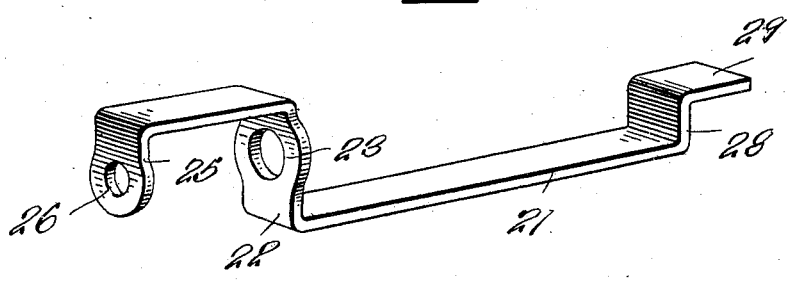

With the above and other objects in view, the present invention consists in the construction and arrangement of parts, shown in the accompanying drawings, in which:

Figure 1 is a side elevation of a runner constructed in accordance with my invention and showing the same applied to a vehicle axle. Fig. 2 is a front elevation of the same. Fig. 3 is a detail vertical sectional view through the runner and bracket for mounting the same; and, Fig. 4 is a detail perspective view of the bracket for the attachment of the runners to the vehicle axle.

Referring more specifically to the drawings, the numeral 5 denotes the base bars of the runner and 6 the cap bars thereof, the said cap bars being connected at their rear ends to brackets 7 including upwardly converging standards or supporting members 8 which are secured at their lower ends to the base bars of the runners and are braced in this position, by means of braces 9 of the ordinary construction.

Extending inwardly and upwardly from the standards 8 of each of the brackets 7 are converging bracket arms 10 which are integrally connected at their meeting ends and have their said ends turned upwardly as at 11 and provided with openings 12 which aline with openings 13 formed in the upper ends of the corresponding brackets 7. Engaged at its ends through the openings formed in each of the brackets 8 and in its sub-bracket 10 is a rod 13′ upon which is disposed an elongated spacing sleeve 14 which has its ends abutting the upper end of the bracket 7 and the upturned connected ends of the bracket 10.

A bar 15 has its ends downturned as at 16 and is provided through its said ends with alining openings 17 through which are engaged the ends of the respective rods 13′, the said ends of the rods 13′ being threaded for the engagement therewith of nuts, whereby the said bars will be held in their proper position.

The numeral 18 denotes an axle which is screw-threaded at its ends, in the usual manner, and which is provided with the usual clips 19. The brackets for the attachment of the runners to the vehicle axles each comprise a bar 21 which has its outer end turned upwardly at right angles to its main portion as at 22 and provided with an opening 23, the remainder of the outer end portion of the bar being thence bent outwardly as at 24 and thence downwardly as at 25 in parallel relation with respect to the portion 22, the said portion 25 being provided with an opening 26 through which and the opening 23 is engaged the threaded end or spindle of the axle 18, the said bar being held against lateral movement from the said spindle by means of a nut 27 which is engaged thereupon.
The inner end of each bar 21 is bent upwardly at right angles as at 28 and thence laterally as at 29 for engagement with the adjacent one of the clips 19. This connection of the bracket with the vehicle axle holds the main or connecting portions of the brackets in spaced relation to the axle, as clearly shown in Fig. 2 of the drawings, and to the said main portions of the brackets are bolted or otherwise removably secured the connecting or main portions of the corresponding bar 15, it being understood that in this manner the runners may be detached from the sled, when desired.

It is to be understood that I do not desire to be limited to the exact details of construction shown and described, for obvious modifications will occur to those skilled in the art.

What is claimed is:

The combination with a vehicle axle and a sled runner, of a bracket comprising a plate having one of its ends detachably connected with the axle and its other end bent upwardly and thence laterally and thence downwardly, the upwardly and downwardly bent portions of the plate being provided with alining openings for the reception of the axle spindle, and a bracket carried by the sled runner and detachably connected with the first named bracket.

In testimony whereof, I affix my signature, in presence of two witnesses.

EMRICK C. BURGESON.

Witnesses:
FRANK CLOCK,
E. G. CARTER.